United States Patent
Piacentini et al.

(10) Patent No.: US 7,456,305 B2
(45) Date of Patent: Nov. 25, 2008

(54) METHOD FOR THE PRODUCTION OF FUEL FROM ACID FATS AND SYSTEM FOR CARRYING OUT SAID METHOD

(75) Inventors: Aldo Piacentini, Wittenbeck (DE); Rene Niesner, Rostock (DE)

(73) Assignee: GMK-Gesellschaft fur Motoren und Kraftanlagen mbH, Bargeshagen (DE)

( * ) Notice: Subject to any disclaimer, the term of this patent is extended or adjusted under 35 U.S.C. 154(b) by 0 days.

(21) Appl. No.: 11/690,501

(22) Filed: Mar. 23, 2007

(65) Prior Publication Data

US 2007/0161809 A1 Jul. 12, 2007

Related U.S. Application Data

(63) Continuation of application No. 10/775,996, filed on Feb. 9, 2004, now abandoned, which is a continuation of application No. PCT/EP02/12536, filed on Nov. 8, 2002.

(30) Foreign Application Priority Data

Nov. 9, 2001 (DE) ................. 101 55 241

(51) Int. Cl.
*C11C 3/00* (2006.01)
*C07C 51/493* (2006.01)

(52) U.S. Cl. ...................... 554/174; 554/167

(58) Field of Classification Search .......... 554/167, 554/174
See application file for complete search history.

(56) References Cited

U.S. PATENT DOCUMENTS

| | | | |
|---|---|---|---|
| 3,273,981 A | | 9/1966 | Fury |
| 3,907,709 A | * | 9/1975 | List et al. .......... 502/8 |
| 4,289,657 A | * | 9/1981 | Nelson .......... 502/314 |
| 4,752,697 A | * | 6/1988 | Lyons et al. .......... 290/2 |
| 5,008,046 A | | 4/1991 | Bremus et al. |
| 5,157,168 A | | 10/1992 | Wilmott et al. |
| 5,525,126 A | * | 6/1996 | Basu et al. .......... 44/308 |
| 5,536,856 A | | 7/1996 | Harrison et al. |
| 5,908,946 A | * | 6/1999 | Stern et al. .......... 554/167 |
| 6,028,215 A | | 2/2000 | Bessling et al. |
| 6,069,261 A | | 5/2000 | Hoffmann et al. |
| 6,224,642 B1 | | 5/2001 | Daly et al. |
| 6,316,646 B1 | | 11/2001 | Tacke et al. |

(Continued)

FOREIGN PATENT DOCUMENTS

EP 0 037 172 * 10/1981

(Continued)

*Primary Examiner*—Yvonne Eyler
*Assistant Examiner*—Yate' K Cutliff
(74) *Attorney, Agent, or Firm*—Darby & Darby P.C.

(57) ABSTRACT

The present invention is directed to a method of producing fuel from vegetable or animal fat having a free fatty acid content by means of catalytic esterification reactions. The method includes esterification of free fatty acids at a higher temperature in a vacuum with one or more multivalent alcohols accompanied by solid neutral catalysts, which are present in a packing bed inside a reactor, whereby the fat travels from top to bottom in the reactor with the alcohol(s) running counter current and a mixture containing alcohol and water being removed from an upper part of the reactor by means of a vacuum effect. The present invention is also directed to the apparatus for implementing the methods disclosed.

20 Claims, 1 Drawing Sheet

U.S. PATENT DOCUMENTS 6,812,359 B2 * 11/2004 Goto et al. .................. 554/170
6,956,125 B2 * 10/2005 Wollmann et al. .......... 552/545

FOREIGN PATENT DOCUMENTS

| EP | 0037172 | 10/1981 |
| EP | 1 126 011 A2 | 8/2001 |
| GB | 634411 | 3/1950 |
| WO | WO-00/05327 A1 | 2/2000 |
| WO | WO-01/12581 A1 | 2/2001 |
| WO | 0129160 | 4/2001 |

* cited by examiner

METHOD FOR THE PRODUCTION OF FUEL FROM ACID FATS AND SYSTEM FOR CARRYING OUT SAID METHOD

This application is a continuation of U.S. patent application Ser. No. 10/775,996, filed Feb. 9, 2004 which is a continuation of International application no. PCT/EP02/12536, designating the United States and filed Nov. 8, 2002, published in German on May 15, 2003, and which claims the priority of German Application No. 101 55 241.6. The prior application is hereby incorporated by reference, in its entirety.

FIELD OF THE INVENTION

The present invention is directed to a method for the production of fuel from vegetable or animal fats which exhibit a concentration of free fatty acids (ffa) within the context of catalytic esterification as well as the apparatus needed for the realization thereof.

BACKGROUND OF THE INVENTION

Fats and oils are regenerative biogenous energy storages. In earlier times, bovine suet for example was only used as cooking fat or in the making of candles. Other animal fats like pig lard and bone fat were considered to be highly nutritional for the human diet. Biological waste fats of every kind were also considered, until very recently, as equally nutritional animal feed for the feedstock industry. Only with the epizootic problems of foot and mouth disease and BSE and the large amount of rendering fats that resulted thereof, did animal fats become more and more realistic as an energy source or diesel alternative.

Fats and oils are triglycerides, i.e., esters comprised of glycerine with various fatty acids, especially higher fatty acids. In general, only those fatty acids which contain more than 12 C-atoms are referred to as higher fatty acids. Normally, triglycerides bind one molecule of glycerine to three molecules fatty acids. Those fatty acids respectively which contain triglycerides vary widely and are dependent on the kind of fat used. In vegetable oils/fats, there are a predominant proportion of unsaturated and polyunsaturated fatty acids, i.e., oleic and linoleic acids. Saturated fatty acids such as palmitic acid play a less important role. In animal fats, the simple unsaturated fatty acids, chiefly oleic acid, and the saturated fatty acids, especially palmitic and stearic acid, predominate. This results in the high melting point of animal fats compared with that of vegetable oils.

Many accompanying substances of fats are not desired for technical utilization. These are to begin with ffa, diglycerides and monoglycerides and glycerine to some extent, which result from the hydrolysis of fats. Sterol, isoprenoid, phospho- and glycolipids are included in this group as well. Through autoxidation of the fatty acids, volatile components such as e.g., aldehydes, alcohols and ketones, and non-volatile components, are formed. The volatile components are mostly responsible for the displeasing aging odors from the fats/oils. The non-volatile components are odorless but accelerate the decomposition process. Also found predominantly in animal fats are heavy metals which the animals ingest through the food chain. This acts catalytically and contributes equally to further decomposition.

If fats or oils are burned and used as an energy source or a fuel substitute, then all of the accompanying substances mentioned, except for heavy metals, can be burned simultaneously, but this makes the handling of fat difficult. These substances shorten the storage-period, act negatively upon the exhaust gas composition and corrosively upon the motor assembly, hence making extensive cleaning measures in the utilization of animal fats unavoidable. The direct use of fat as fuel in diesel motors has already been mentioned in DE 31 17 374 A1. Because animal fats have a relatively high melting point, heating the fuel is imperative. Utilization is possible and relatively easy to realize. Long term attempts with diesel motor usage however displayed a major problem in animal fat use. Due to the high ffa concentration, maximum life expectancy is considerably limited. Especially components which are mechanically under high stress such as, for example, the entire injection system of modern diesel motors show wearing after a few hours of operation. This is why it is so astonishing that corrosion of the DE 196 22 601 C1 can be traced back to an excessively high proportion of glycerine, whereas used grease by comparison with an acidity of 75% can be expected to function trouble free in a diesel motor process. "The known damage mechanism" mentioned in this patent specification was not explained further therein and is in blatant contradiction to the analysis conducted by the declarant in connection with the subsequently illustrated invention, and to the analysis initiated by her and carried out by the specialized professional research facilities and well-known motor manufacturers. Such a usage as fuel must be doubted upon and can only lead to a financial loss for the user.

There exists a series of methods for preparing fats for motor processes. The fibril and heavy metals can be removed through ordinary washing with aqueous acid solutions. Phosphoric and citric acids are two such possible acids which are especially suitable and are already often utilized. Through such a washing process, the corrosive components, the fatty acids, are not removed. The possibility to remove fatty acids by washing with diluted sodium hydroxide exists. This method is only suited for fatty acids of low concentration. The common fats may contain 25 percent by weight fatty acids or more. This corresponds to a total acid number (KOH-No.) of 50. Aimed at however is a KOH-No. of at least 0.5 or less. 900 additional liters of sodium hydroxide are necessary for the neutralization of 1000 kg fat with 1 M NaOH. Such a method is therefore obviously inefficient for the handling of fats.

Further described possibilities to lower the acidity are the separation of fatty acids through steam distillation (Lurgi) and through selectively effective extracting agents such as for example with an isopropanol/hexane mixture. Alkaline extracting agents will be mentioned for example in DE 199 18 097 A1. The extraction with polyethylene glycols will be described in DE 196 38 459 A1. A chemical conversion of the fatty acids directly into animal fat is an exception. The DE 199 56 599 A1 is concerned with the esterification of ffa in fats with monovalent short chained alcohols in the presence of lipases.

The production of bio diesel using vegetable oils, especially rape oil or sun flower oil, is increasingly preferred by professionals. Several plants have come into production or been built very recently. The oil is completely base-split into the fat components glycerine and fatty acids. Subsequently, the accrued fatty acids are esterified with methanol. Thus generating a fatty acid methyl ester and, as side product, glycerine. The transesterification from fatty acids is basically possible with such apparatus and functions according to the same principle. Further developments, according to DE 697 01 014 D2, concern themselves with the use of ethanol as an esterification reagent.

Thus, it is shown that the previous methods are unsatisfying, especially complicated, extensive and inefficient. This is especially because either an extensive transesterification must be carried out in order to obtain fatty acid methyl esters for example, or the corrosive components in the form of ffa are only removed with great effort. It is therefore the task of the presently claimed invention to further present the previously described method so that the desirable advantages will be targeted.

SUMMARY OF THE INVENTION

This task, pursuant to the invention, is solved by the ffa, which are contained in the fat, being esterified at a higher temperature and in a vacuum with one or more multivalent alcohols in the presence of solid neutral catalysts which occurs in a packing bed inside the reactor. The fats flow thereby from the top to the bottom of the reactor, counter current to the alcohol. A mixture containing alcohol and water is abstracted in the upper part of the reactor by a vacuum pump.

In conjunction with the present methods, also provided herein is an apparatus for the implementation of the methods disclosed.

DETAILED DESCRIPTION

Figure 1:
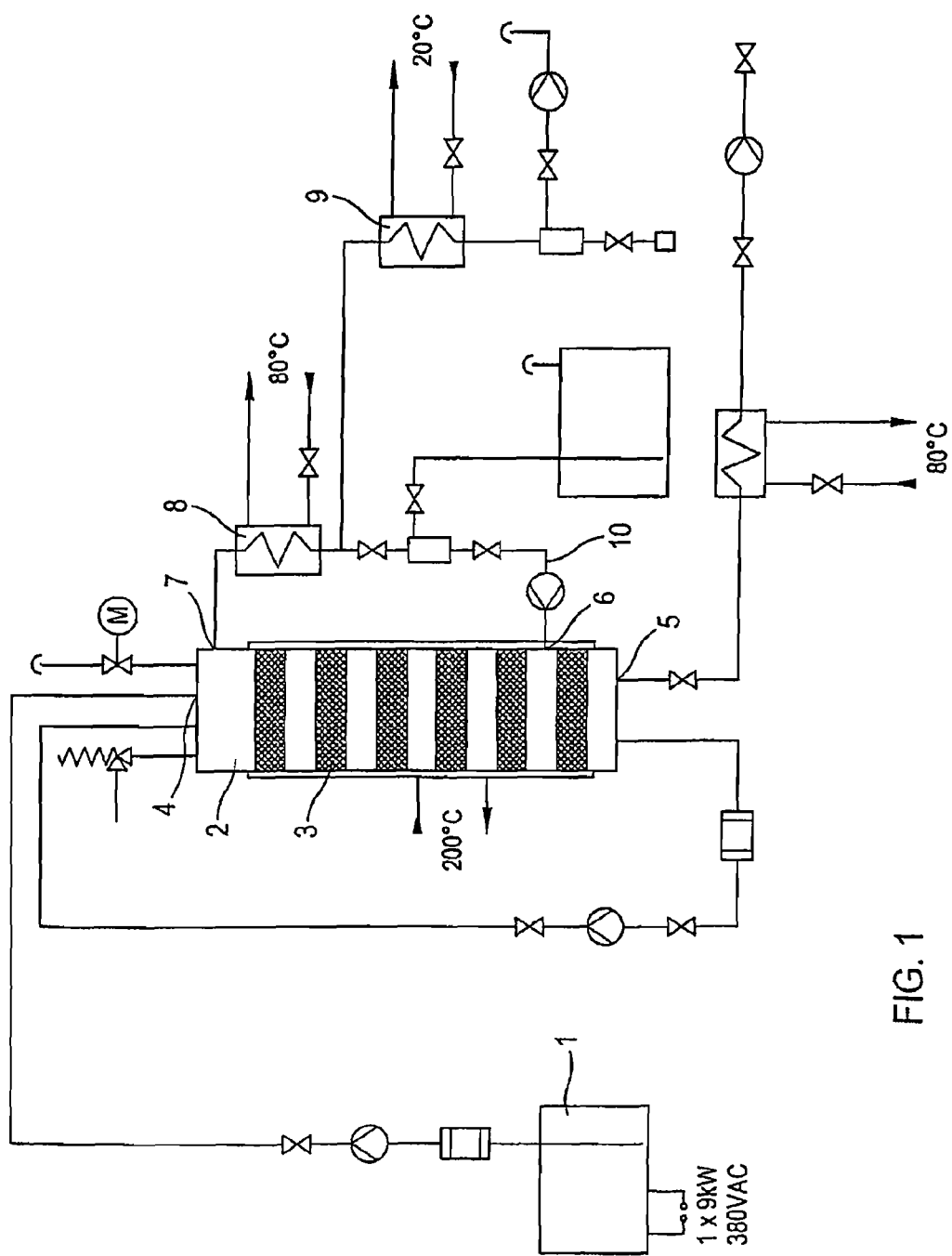
FIG. 1 displays the apparatus for the implementation of the method pursuant to the invention. The FIG. indicates a heated container (1) from which fat and/or oil is introduced in the tower apparatus (2) with at least one packing bed (3) of solid neutral catalyst, an inlet (4) in the upper part of the tower apparatus to insert the fat, an outlet (5) in the lower part of the tower apparatus for removal of the neutralized fat, an inlet (6) in the lower part of the tower apparatus to insert alcohol, an outlet (7) in the upper part of the tower apparatus from which a mixture containing water and alcohol is drained by means of a vacuum pump (8). Furthermore, the apparatus includes a device (8/9) for condensation of the alcohol-water mixture intended for separate condensation of alcohol and water, thereby directing the initially condensed alcohol back into the tower apparatus through a conduit (10).

Within the scope of the invention, the resulting vegetable and animal fats are therefore drawn upon for the production of fuel. Especially worthwhile is the application of the method, as per the invention, involving fats, which have a total acid number (KOH-No.) of at least 10, especially those having a total acid number of at least 30. The total acid number of the applied fats lies preferably above 150 and even better above 80. Those fats which have a total acid number of 60 or above, correspond to 30% or more and are to be found in common rendering fats for example, can be dealt with trouble-free. To identify an adequate basic raw material for the invention, the concentration of ffa can also be taken into account, which relative to fatty oils, is expressed in percentages (%). The acidity lies preferably between 5 and 75%, especially between 15 and 40%.

Especially, animal fats, waste fats, rendering fats, industrial waste fats, fats from oil traps and from sewage plants, as well as vegetable fats or oils with a high concentration of ffa, respectively count as suitable vegetable or animal fats pursuant to the invention.

Land animal fat, especially pig lard, mutton and bovine suet, horse fat as well as goose and chicken fat can be used especially advantageously. The use of fish oils with a high concentration of ffa is very advantageous. The fish oils are characterized by their high concentration of multiple unsaturated fatty acids. Acid fats can normally be directly implemented in the state they are delivered in. In individual cases it may be purposeful to reduce a too high proportion of water. This may be achieved through a prearranged decanter. With a low proportion of water, the separation of water may occur automatically during the heating-up phase of the fat in the apparatus.

The methods which are most commonly used in practice recommend a hydrolysis with subsequent esterification of the fatty acids to methyl ester. The method pursuant to the invention differentiates itself from the aforementioned in that an esterification of the ffa through the application of a bivalent or multivalent alcohol occurs. If, within a normal saturated hydrocarbon, every 1 H-Atom connected to several C-Atoms is replaced through hydroxyl groups, then the result will be multivalent alcohol. The simplest agents of substances of this class are the bivalent alcohol ethylene glycol, the trivalent alcohol glycerine and the tetravalent alcohol pentaerythritol. Basically, those alcohols can be considered in which the number of the C-atoms merely exceeds the number of (at least 2) OH-groups in the molecule. It can also, for example, concern propandiol, butandiol, or butantriol. Pentite, for example, comes into question as a pentavalent alcohol. Within the bounds of the methods which are pursuant to the invention, ethylene glycol and glycerine are preferred, whereas these can be used mixed in individual cases. Glycerine has the special advantage that it leads, on the one hand, to the fatty acids being transferred into a triglyceride which is then chemically comparable to the main mass, and on the other hand, it can bind a larger amount of fatty acids and is more favorable in the mass balance. The esterification is purposely carried out with a stoichiometric excess of alcohol compared with that of the fatty acids contained in the implemented fats or oils respectively. Thereby it is especially advantageous when in 1 part per weight free fatty acids, ⅒ to ⅛ part per weight ethylene glycol or glycerine is accounted for.

Because the base material of the method, as per the invention, is solid, especially in the case of animal fat with a high concentration of ffa, it is necessary to transfer this into a pumpable state through preheating. The fatty acids which are originally already fluid or the fats which are made pumpable through preheating can undergo a preliminary cleansing when necessary. A coarse filter for the removal of small suspended particles, sand grains, or other grainy impurities can be used. A further cleansing is not generally necessary.

The base material which is preheated and pre-cleaned where applicable is then transferred to an appropriate esterification reactor which could very well be a tower apparatus. If, as a result, the tower apparatus is referred to subsequently, then the specifications made there apply to comparable esterification reactors accordingly.

The esterification reaction in the tower apparatus is undertaken preferably at a temperature of 150 to 220° C., preferentially from 190 to 200° C. which especially applies to the use of animal fat. The tower apparatus is duly heated up to the reaction temperature. This can be done electrically. Appropriately, one can thereby use the waste heat of a power plant for the operation of which the neutralized procedural product may be implemented. The abstracted heat hereof can also be used to preheat the base material. During the heating-up phase, the material is already appropriately circulated by a pump i.e. the fat is sucked up at the foot of the tower apparatus and inserted at the top.

The tower apparatus is further put into a vacuum during the heating phase by means of a vacuum pump. The vacuum thereby is adjusted preferably to 7 to 250 mbar, preferentially to 15 to 50 mbar. By adjusting the vacuum the fat is pre-dried in the tower apparatus. The initial time of the esterification is also shortened. After this, the amount of multivalent alcohol necessary for the esterification is inserted in the reaction through a dispenser at the bottom of the tower apparatus. The alcohol is lighter and rises slowly upward while the fat sinks downward which results in a counter current esterification of the ffa of the used material. A stoichiometric excess of multivalent alcohol is normally not required because free alcohol groups, with which the free fatty acids can esterify as well, are still available in the base material.

The neutral solid catalyst is stored preferably in several column plates within the tower apparatus. Basically, the catalyst or the particular packing bed, as the case may be, is formed in such a way as to cover the largest reaction area possible. It is advantageous if the catalyst allows an optimal flow, especially the forming of turbulences, to achieve an especially beneficial catalytic effect. Many common metals for this method can be considered as solid neutral catalysts, especially aluminium, antimony, barium, lead, cadmium, iron, copper, manganese, titanium, tin, zinc, and their oxides, salts, and/or alloys. It can generally be assumed that a splitting of the fat molecules in glycerine and fatty acids is not to be expected under the terms of the adjusted reaction pursuant to the invention. Otherwise, the reaction conditions are to be changed by experts accordingly, with the basic conditions of the invention taken into account.

Many neutral metallic catalysts which are suitable for the esterification of fatty acids with alcohol, are described in specialist literature. One of the catalysts mentioned is zinc dust which takes part in the reaction with a percentage weight of about 0.2 relative to the total mass of the reaction materials. This mass-surface-relation corresponds with a reactive surface of about 56 $m^2$ per ton of animal fat. But zinc dust, contrary to the specifications of current technology, cannot be used because it acts abrasively and therefore would destroy the pumps as well as plug the filter equipment. Furthermore, the quality of the reaction material would be worsened by zinc particles. There are many further possibilities for the usage of zinc in other technical or physical forms. However, an adequately large zinc area needs to be considered, relative to the total mass of animal fat and to the ffa contained within. It is therefore constructive to pay attention to the following: the mass-surface-relation of the zinc catalyst needs to be kept fairly small. Next to rings, pipes or reactant fill-body, zinc wire which was wrapped into a spiral proved to be an especially simple and adequate solution and meets all essential requirements. Because zinc is a relatively soft material a tower apparatus cannot therefore be entirely filled with zinc spirals because the deadweight of the zinc catalyst would deform the lower spiral layers, e.g. at a reaction temperature of 200° C. With such a deformation of the spirals, a directed flow in the reaction container would no longer be possible. For this reason, it is especially advantageous to embed the catalyst, the pressure diminished, into the reaction container above trays, preferably on several, but at least on two packing beds.

Spirals have a great advantage. They ensure an excellent horizontal mixing of the reaction material with a low flow resistance. The intense mixing of the reaction materials occurs with low as well as with high flowing speeds so that the mechanical aid of an agitator for instance, considering all its mechanical applications, is not necessary for the mixing process. This makes a continuous guidance of the reaction possible. Basically, the expert may decide, independent of the kind of catalyst and its physical setup, if the method as per the invention is conducted batch wise or continuously.

The previously mentioned explanations made in connection with the use of a zinc catalyst are, which is immediately evident to experts, effective for all other catalysts having similar basic features such as catalytic effectiveness or the aforementioned softness. In any case it is possible, considering the description of the invention, not only to carry out the special shaping of a packing bed or packing beds but also to adjust the further suitable parameters so that the method can solve the set task.

The resulting reaction water from the esterification process is gaseous, under the terms of the aforementioned reaction conditions, and is preferably removed from the reaction mixture by a vacuum pump and caught in a distillation bulb by a product cooler. The removal of the reaction water leads to a dynamic balance which otherwise occurs and does not allow further esterification. Therefore, the removal of water is necessary for an advantageous implementation of the method, pursuant to the invention, because the esterification reaction would not otherwise run entirely. The employed alcohol which also boils under the conditions mentioned is inserted into the reaction in an upstream reflux cooler through a cooling trap and dispenser. Consequently, the loss of alcohol is to a large extent ruled out. Therefore, a mixture containing alcohol and water is removed from the esterification system and is put through a differentiated condensation in which the separately condensed alcohol is reintroduced to the esterification system. The reflux cooling for the condensation of the employed alcohol is achieved by water with a temperature of 75 to 85° C., preferably about 80° C., which occurs in a practical invention design. The water is still gaseous with a pressure of about 20 mbar and at a temperature of about 80° C. so that only the alcohol condenses under reflux which can be cooled by water at a temperature of 20° C.

In general, the esterification reaction to be implemented as per the invention is finished after about 6 hours. The neutralized or post-esterified fat is pumped off at the bottom of the tower apparatus, and appropriately inserted into a washing column to remove catalyst waste and other unwanted contaminants. Especially aqueous organic acids can be used as the washing fluid, preferably a citric acid solution of 0.05 to 0.5 percent and even better, a citric acid solution of approximately 0.1 percent. In general, a decolorization of the product is not necessary because the dark brown discoloring resulting from combustion in a power plant, especially in a thermal power station or a large diesel engine does not have a negative influence.

The yielded product of the method can be, preferably without excessive cooling, implemented immediately in the aforementioned washing methods for the operation of the aforementioned power plant. In the case of hardening, it is advantageous to preheat the material and then insert it into the power plant.

Essentially, the constructive characteristics of the apparatus, which are especially suited to the implementation of the method as per the invention, have already been dealt with. Therefore, such apparatus is especially characterized by a tower apparatus with at least one packing bed layer of a solid neutral catalyst, an inlet in the upper part of the tower apparatus for inserting the fat, an outlet for the removal of the neutralized fats, an inlet in the lower part of the tower apparatus for inserting the alcohol so that it flows counter current to the 'to be treated' fat through the packing bed layer and an outlet in the upper part of the tower apparatus to which a vacuum is connected to drain the mixture which contains water and alcohol. As previously shown, there are preferably at least two packing beds arranged in the reaction system. It is especially advantageous when the solid neutral catalyst is in spiral form in the packing bed, especially in connection with zinc as catalyst material. It is furthermore purposeful to plan a device (8/9) for the condensation of the alcohol-water mixture through which the initially condensed alcohol can be piped back into the tower apparatus.

A narrow container with a 1:1 to 1:20 ratio (diameter to length respectively) can be used for the tower apparatus or reaction container which appropriately consists of stainless steel and is equipped with a double wall. The solid catalyst is embedded inside of this in several plates from the bottom to just underneath the maximum fill level. The fat inlet, as well as the measurement devices for pressure and fill level, is located in the upper part of the tower apparatus. Furthermore, a connecting piece for the reflux cooler is located on the side above the maximum fill level. A connecting piece for sucking up liquid is located at the foot of the tower apparatus as well as a device for inserting alcohol a little above the bottom of the apparatus. The necessary reaction temperature is achieved preferably by heating up thermo oil through the double wall. The conduit and the tower apparatus are thermally insulated. There is a connection from the upper opening of the reflux cooler to the product cooler which has a slope of 2 percent. A cooling trap is mounted on the lower opening of the product cooler to hinder reaction water from being taken in. The connection to the vacuum pump is located at the upper part of the cooling trap.

The invention distinguishes itself through its manifold advantages. Especially raw animal fat can be used which generally means a mixture of tri-, di- and monoglycerides as well as ffa and glycerine. The amount of ffa can even be more than 25 percent of the total mass. The obtained fuel substitute has neutral characteristics and consists mostly of esters of multivalent alcohols. One of the remarkable features of the fuel substitute is that no mineral fuel additives like methanol, gasoline and diesel fuel are necessary. Power plants like combined heat and power unit (CHP) and large diesel engines can be operated with this regenerative fuel substitute.

Usage of animal fat as fuel is not yet current technology. The higher melting point of the triglycerides as well as the high acid value which would negatively influence the expected useful life of power plants was problematic. The invention has overcome this problem. Therefore, an advantageous neutralized animal fat emerges as a fuel substitute which has excellent combustion properties compared with mineral fuels due to a higher oxygen concentration. It produces much less exhaust emissions. It does not contain sulphur which is another advantage compared to a conventional mineral fuel. Furthermore, the global CO2 balance is not strained (regenerative energies). The neutralized animal fat can be directly injected and burnt through modifications to the internal combustion engine. In an especially preferred arrangement of the invention, the reaction compound (animal fat) is extracted by means of a vacuum pump and a temperature-stable circulation pump flows counter current to the alcohol used in the esterification process i.e. from the top to the bottom of the reaction apparatus, preferably in a tower apparatus. In this way an especially homogeneous reaction mixture is produced which is optimal to work with. According to current technology, stirring devices are used in esterification reactors. These are not necessary in this invention which leads to further advantages. The high technical expenditure of a vacuum stirring device is omitted and a continuous process management made possible.

Another advantage to the method, as per the invention, consists therein that it is economical and makes decentralized fat processing possible which can then be adapted to any apparatus size. The decentralized fat processing leads to lower costs for transport (relative to a centralized mass processing) as well as low costs for storage. Therefore, the location choice for power plants is more variable. Furthermore, preservatives do not have to be used in this method which results in cost reduction. The obtained fuel substitute can be perpetually fed into power plants which are continuously in operation. It is useful, in the framework of the method pursuant to the invention, to put the preferably pumpable animal fat through a coarse filter before bringing it into the reaction system. Washing it is not necessary in this method. A pre-cleansing of the fat has always been necessary in previous methods. A color reinforcement occurs after the esterification reaction due to a lack of a pre-cleaning. This fact, however, is not relevant for its later use as a fuel substitute in power plants.

EXAMPLES

The following Example illustrates the invention, but is not limiting.

Example 1

Method of Producing Fuel From Fat

The present invention demonstrates the use of an apparatus in the formation in fuel from a fat source.

A tower apparatus is used as a reaction container. This apparatus has a ratio of 1:10 from diameter to height (inner diameter: 60 cm, height: 550 cm). It is comprised of stainless steel and is equipped with a double wall. Five packing beds (height: 60 cm) of a neutral solid catalyst are located in the reaction tower in the form of zinc spirals. These zinc spirals are placed on a tray made of stainless steel. An inlet for fat and a measurement device for pressure and fill level are located in the upper part of the apparatus. A connecting piece or conduit respectively for a subsequent cooler which is in a vacuum is additionally located in the upper part of the apparatus. A suction nozzle is located at the foot of the apparatus as well as an inlet above the floor to insert the alcohol. The reaction temperature is achieved by the heating of thermal oil through the double wall. A condensation sump functioning as a cooling trap is mounted to the lower opening of the product cooler to hinder reaction water from flowing back in. The connection to the vacuum pump is located at the upper part of this condensation sump.

The following procedural parameters are chosen for the implementation of the method in the above mentioned apparatus:

fat material with high concentration of ffa in form of 1000 kg animal fat amount of glycerine as multivalent alcohol: 27 kg reaction temperature: 200° C.

vacuum: 20 mbar reaction duration: 5 h

After the reaction is finished, 1000 kg of fat is removed which can be immediately implemented in the heating process of a CHP. This fat can be washed with a 0.1 percent by weight aqueous citric acid solution, when necessary.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

Patents, patent applications, publications, product descriptions, and protocols are cited throughout this application, the disclosures of which are incorporated by reference herein in their entireties for all purposes.

What is claimed is:

1. A method of producing fuel from vegetable or animal fat or oil, which has a free fatty acid (ffa) content by means of catalytic esterification reactions, comprising: esterification of free fatty acids contained in the fat at a temperature from about 150° C. to about 220° C. in a vacuum of less than 250 mbar with a divalent alcohol, trivalent alcohol, and combination thereof accompanied by solid neutral catalysts, which are present in a packing bed inside a reactor, whereby the fat travels from top to bottom in the reactor with the alcohol(s) running counter current and a mixture containing alcohol and water being removed from an upper part of the reactor by means of a vacuum pump and caught in a distillation bulb by a product cooler.

2. The method according to claim 1, wherein the vegetable or animal fat or oil is selected from the group consisting of animal fats, waste fats, rendering fats, fats from oil traps, fat from sewage plants, fat from industrial processes, marine animal oils, fat from vegetable fats or oils with a high concentration of free fatty acid, and combinations thereof.

3. The method according to claim 2, wherein the animal fat is land animal fat selected from the group consisting of pig lard, bovine and mutton suet, horse fat, and combinations thereof.

4. The method according to claim 2, wherein the marine animal oil is fish oil.

5. The method according to one of the claims 1 through 3, wherein the fats or oils are present in amounts ranging from about 5 to about 75 percent per weight free fatty acid content.

6. The method according to one of the claims 1 through 3, wherein the fats or oils are present in amounts ranging from about 15 to about 40 percent per weight free fatty acid content.

7. The method of claim 1, wherein the alcohol is selected from the group consisting of ethylene glycol, glycerine, and a combination thereof.

8. The method of claim 1, wherein the alcohol is used in a stoichiometric excess for the free fatty acid which is contained in the fats or oils.

9. The method of claim 1, wherein the esterification occurs at a temperature preferably ranging from about 190 to about 200° C.

10. The method of claim 1, wherein the vacuum is in a range from about 7 to about 250 mbar.

11. The method of claim 1, wherein the vacuum is in a range from about 15 to about 50 mbar.

12. The method of claim 1, wherein the solid neutral catalysts are selected from the group consisting of tin, zinc, and their oxides, salts, alloys, and combinations thereof.

13. The method of claim 1, wherein the reactor is a tower shaped reactor with at least two packing beds being arranged within.

14. The method of claim 1, wherein the solid neutral catalyst exists in a form of spirals.

15. The method of claim 1, wherein the mixture containing alcohol and water is a fractionated condensation, wherein condensed alcohol re-enters the reactor.

16. The method of claim 1, wherein the esterification process further comprises letting out neutralized fat produced by the reactor and removing possible catalyst remnants and other contaminants by washing with an aqueous organic acid in an amount ranging from about 0.05 to about 0.5 percent aqueous citric acid solution.

17. The method of claim 1, wherein the vegetable and/or animal fats or oils are transformed into a pumpable state and inserted into the reactor.

18. The method of claim 17, wherein the pumpable vegetable and/or animal fat comprises running the fat through a coarse filter before entering the reactor where the removal of suspended particles or grains of sand and other granular contamination occurs.

19. The method of claim 1, wherein neutralized vegetable and/or animal fat is directed into a power plant selected from the group consisting of a combined heat and power unit and a large diesel engine.

20. The method according to claim 19, wherein heat produced by operating the power plant is used for heating the reactor and pre-heating the vegetable or animal fat.

* * * * *